(12) United States Patent
Matsuda et al.

(10) Patent No.: US 7,568,403 B2
(45) Date of Patent: Aug. 4, 2009

(54) TRANSMISSION AND MOTORCYCLE COMPRISING THE SAME

(75) Inventors: Yoshimoto Matsuda, Kobe (JP); Takao Kaneko, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 415 days.

(21) Appl. No.: 11/494,802

(22) Filed: Jul. 26, 2006

(65) Prior Publication Data

US 2007/0026994 A1 Feb. 1, 2007

(30) Foreign Application Priority Data

Jul. 27, 2005 (JP) ............... 2005-217651

(51) Int. Cl.
*F16H 59/00* (2006.01)
(52) U.S. Cl. ..................... 74/335
(58) Field of Classification Search .......... 74/335
See application file for complete search history.

(56) References Cited

U.S. PATENT DOCUMENTS

| | | | | |
|---|---|---|---|---|
| 5,224,393 A | * | 7/1993 | Ashikawa et al. | 74/337.5 |
| 6,085,607 A | * | 7/2000 | Narita et al. | 74/335 |
| 6,443,278 B1 | * | 9/2002 | Hori et al. | 192/3.58 |
| 7,096,753 B2 | * | 8/2006 | Kawakubo et al. | 74/337.5 |
| 7,174,800 B2 | * | 2/2007 | Kawakubo et al. | 74/337.5 |
| 7,351,185 B2 | * | 4/2008 | Kobayashi et al. | 477/111 |

FOREIGN PATENT DOCUMENTS

| | | |
|---|---|---|
| JP | HEI2-107867 | 8/1990 |
| JP | 11-059217 | 3/1999 |
| JP | 2002-206628 | 7/2002 |

* cited by examiner

*Primary Examiner*—Ha D. Ho
(74) *Attorney, Agent, or Firm*—Alleman Hall McCoy Russell & Tuttle LLP (57) ABSTRACT

A transmission configured to change a gear position by rotation of a shift drum operative in association with an operation of a change pedal, including a potentiometer configured to detect a rotational angle of the shift drum; and a determiner configured to determine a gear position based on whether or not a value of a signal output from the potentiometer falls within a determination band having a predetermined range.

10 Claims, 11 Drawing Sheets

|  | 1st GEAR POSITION | 2nd GEAR POSITION | 3rd GEAR POSITION | |
|---|---|---|---|---|
| POSITIVE | $T_{01}$ | $T_{02}$ | $T_{03}$ | |
| NEGATIVE | $T_{11}$ | $T_{12}$ | $T_{13}$ | |

ND MOTORCYCLE
TRANSMISSION AND MOTORCYCLE COMPRISING THE SAME

TECHNICAL FIELD

The present invention relates to a transmission configured to change a gear position by rotation of a shift drum operative in association with an operation of a change pedal and, more particularly to a structure for detecting a rotational angle (phase) of the shift drum.

BACKGROUND ART

A transmission equipped in a motorcycle typically includes a shift drum configured to rotate in association with an operation of a change pedal, and is configured to rotate the shift drum to cause a shift fork to pivot, thereby changing a gear position, namely, a gear mesh. Such a transmission is disclosed in, for example, Japanese Laid-Open Patent Application Publication Nos. Hei. 11-59217 and 2002-206628, and Japanese Utility Model Application Publication No. Hei. 2-107867. The transmission is equipped with a resistive contact sensor to detect a rotational angle of the shift drum corresponding to the gear position.

The resistive contact sensor typically includes an arm extending in a direction substantially perpendicular to a rotational axis of the shift drum, and a resistive element configured to contact a tip end of the arm. The resistive element is fixed to a vehicle body of the motorcycle, whereas the arm is rotatable integrally with the shift drum. According to the rotation of the shift drum, a contact point between the arm and the resistive element changes. The resistive contact sensor outputs a signal with a potential according to the contact point.

In motorcycles, an ECU (electric control unit) detects a rotational angle of the shift drum based on a signal output from the resistive contact sensor, and determines whether or not the gear position has been upshifted according to the rotation of the shift drum. If it is determined that the position has been upshifted, then the ECU causes an ignition device of an engine to reduce the number of times of ignition or to retard an ignition timing so that the engine can conform to a condition of the upshifted gear position.

In the conventional configuration, to detect the position of the shift drum after rotation by using the resistive contact sensor, a correct contact state between the resistive element and the arm in a rotational direction of the shift drum and in a direction perpendicular to the rotational direction cannot be maintained, causing the signal output from the sensor to include noise. As a result, a relatively long time is required to stabilize the value of the signal potential according to the stop position of the shift drum. In order to enable the engine to conform to the condition of the upshifted gear position by reducing the number of times of ignition or by retarding the ignition timing, it is necessary to determine whether or not the gear position has been upshifted, immediately after start of the rotation of the shift drum. Typically, the gear position is upshifted when an engine speed is increasing, i.e., during a cycle in which the ignition in the ignition device is short. For this reason, correct reduction of the number of times of ignition, etc, is unable to be accomplished unless it is determined whether or not the gear position has been upshifted, immediately after the start of the rotation of the shift drum.

In order to solve the above mentioned problem, in addition to the resistive contact sensor equipped in the transmission, a load cell is mounted to a shift rod, and based on a signal issued from the load cell, it is determined whether a rider has operated a shift pedal to upshift or downshift a gear position. In general, since the signal from the load cell has a small amplitude, an amplifier is disposed between the load cell and the ECU to amplify the signal. When the resistive contact sensor, the load cell, the amplifier, etc., are incorporated into the transmission, the transmission becomes expensive. In addition, the components to be maintained increase in number.

SUMMARY OF THE INVENTION

The present invention addresses the above described conditions, and an object of the present invention is to provide a transmission that is capable of correctly controlling an ignition timing of an engine when a gear position has been upshifted, with fewer components, and a motorcycle comprising the transmission.

According to one aspect of the present invention, there is provided a transmission configured to change a gear position by rotation of a shift drum operative in association with an operation of a change pedal, comprising a potentiometer configured to detect a rotational angle of the shift drum; and a determiner configured to determine a gear position based on whether or not a value of a signal output from the potentiometer falls within a determination band having a predetermined range.

In such a configuration, it is possible to inhibit generation of noise, which is caused by an incorrect contact state between an arm and a resistive element of the conventional resistive contact sensor. After the rotating shift drum stops, the signal output from the potentiometer is stabilized soon to a value according to a stop position of the shift drum. Therefore, it is possible to determine whether or not the gear position has been upshifted immediately after the shift drum starts to rotate, and thus the engine is able to conform to a condition of the changed gear position by suitably reducing the number of times of ignition in the ignition device or by suitably retarding the ignition timing in the ignition device. Furthermore, a transmission having such a construction can be achieved with a fewer components.

As used herein, the term potentiometer refers to a sensor that has an input shaft rotatable integrally with a component (in the present invention, shift drum) whose rotational angle is detected, and is configured to output a signal (voltage signal) according to a rotational angle (phase) of the input shaft. Most commercially available potentiometers having suitable dimensions and suitable detecting abilities may be used. For example, a potentiometer such as Orange Pot manufactured by MIDORI PRECISIONS CO. LTD or a potentiometer manufactured by NOVOTECH CO. LTD may be used. In addition, a rotational angle sensor may be used, which is capable of outputting a signal having a substantially correct value relative to the rotational angle of the input shaft, which does not substantially produce noise caused by, for example, an incorrect contact state between an arm and a resistive element of a resistive contact sensor in a rotational axis direction or in a rotational direction of a shift drum.

The determination band may be set for each gear position and a dead band, which is not a reference by which the determiner determines the gear position, may be set between adjacent determination bands by which the determiner determines the gear position. In such a configuration, it is possible to avoid an event in which a determination result changes between adjacent gear positions immediately after the gear position has been changed, even if the signal output from the potentiometer contains a little noise. For example, when the dead band is set between determination bands of signal values corresponding to a 2nd gear position and a 3rd gear position, the determination result of the gear position does not change, thus inhibiting so-called "chatter" between the 2nd gear position and 3rd gear position immediately after the gear position has been changed.

The determiner may be configured to determine that the gear position has been changed when an absolute value of a change rate of the value of the signal output from the potentiometer is larger than a predetermined threshold. In such a configuration, it can be correctly determined that the gear position has been changed, immediately after the shift drum starts to rotating in association with the operation of the shift drum, for example, before detecting a signal corresponding to the changed gear position.

The determiner may be configured to determine whether the gear position has been upshifted or downshifted, based on whether the change rate of the value of the signal output from the potentiometer is positive or negative. In such a configuration, it is possible to determine whether or not the gear position has been upshifted, immediately after the shift drum starts rotating in association with the operation of the change pedal.

The threshold may be set for each gear position. In such a configuration, since the threshold is set for each gear position, it can be correctly determined that upshifting from one gear position to another gear position has been performed, even if a difference in rotational angle between adjacent gear positions varies for each combination of adjacent gear positions.

The transmission may further comprise a controller configured to control an operation of an ignition system configured to ignite a fuel gas in an interior of a combustion chamber of an engine. The controller may be configured to cause the ignition system to retard ignition timing or to reduce the number of times of ignition, when the determiner determines that the gear position has been upshifted. By retarding the ignition timing or by reducing the number of times of ignition, the engine is able to conform to a condition of the upshifted gear position.

The potentiometer may include an input shaft which is coupled to the shift drum through a damper made of synthetic resin that is fitted between the input shaft and the shift drum, and is configured to be rotatable substantially integrally with the shift drum. Thereby, noise contained in the signal output from the potentiometer can be reduced.

The input shaft of the potentiometer may be configured to be press-fitted into the damper. Since the input shaft of the potentiometer can be firmly coupled to the damper, the noise contained in the signal output from the potentiometer can be reduced.

The damper may be accommodated in a concave portion formed at an end portion in an axial direction of the shift drum, and the shift drum may be provided with a stop portion configured to inhibit disengagement of the damper from the concave portion. Since disengagement of the damper is inhibited, a firm coupled state between the shift drum and the potentiometer can be maintained.

According to another aspect of the present invention, there is provided a motorcycle comprising a transmission configured to change a gear position by rotation of a shift drum operative in association with an operation of a change pedal, the transmission including a potentiometer configured to detect a rotational angle of the shift drum; and a determiner configured to determine a gear position based on whether or not a value of a signal output from the potentiometer falls within a determination band having a predetermined range. Thereby, it is possible to achieve a motorcycle including such a transmission, which is able to correctly determine gear position and to correctly determine whether or not the gear position has been upshifted, with fewer components.

The above and further objects and features of the invention will more fully be apparent from the following detailed description with accompanying drawings.

DETAILED DESCRIPTION OF THE PREFERRED EMBODIMENTS

Hereinafter, a transmission of the present invention, and a motorcycle comprising the same will be described with reference to the accompanying drawings. By way of example, a large-sized motorcycle will be described. As used herein, the term "forward" refers to the direction in which the motorcycle is running, and other directions means directions seen from the perspective of a rider mounting the motorcycle, except for a case specifically illustrated.

Figure 1:
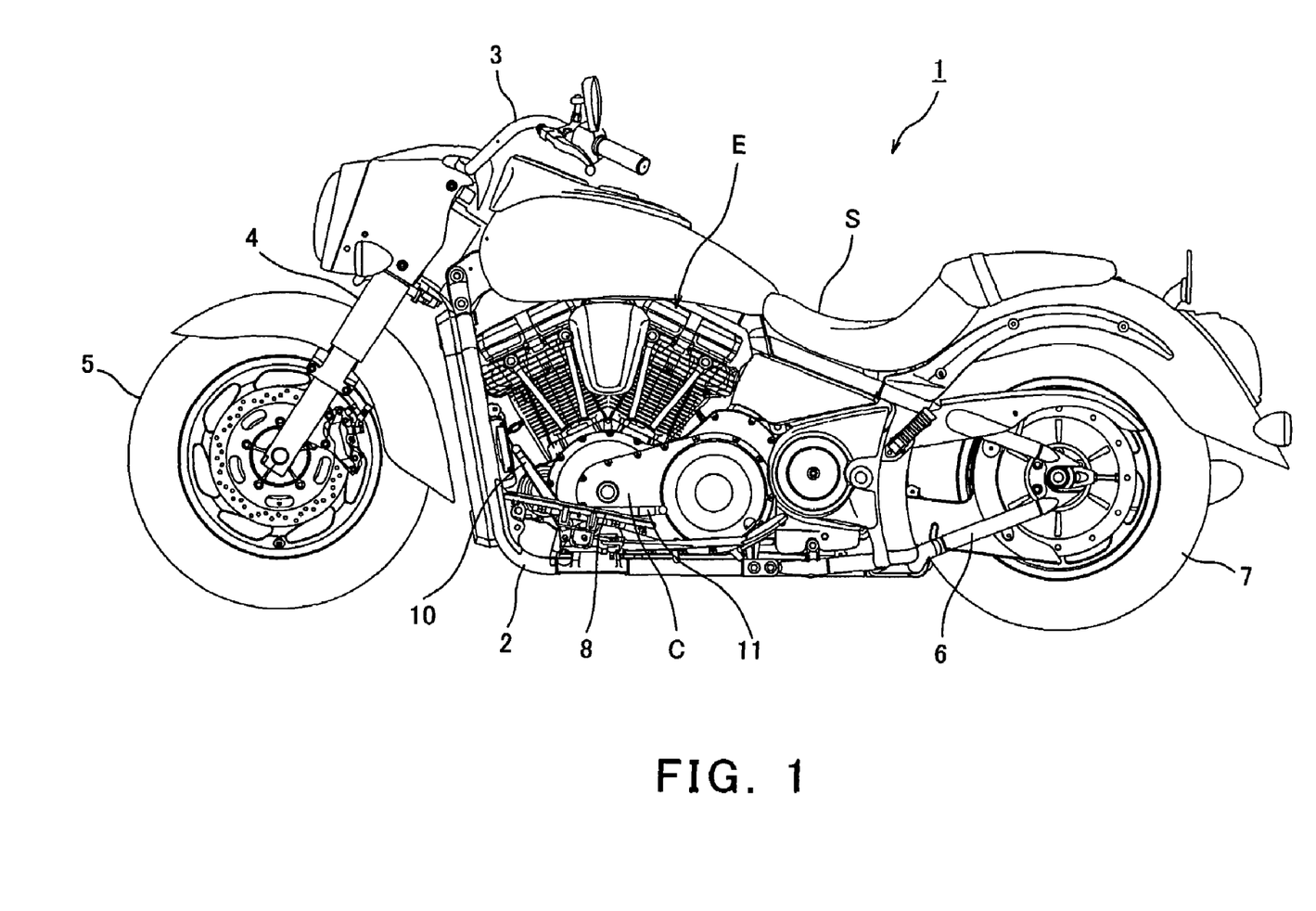
FIG. 1 is a left side view of a large-sized motorcycle according to an embodiment of the present invention.

FIG. 1 is a left side view of a large-sized motorcycle 1 according to an embodiment of the present invention. Turning now to FIG. 1, the motorcycle 1 is a large-sized cruiser motorcycle. A V-type two-cylinder four-cycle engine E is mounted in a center section of a vehicle body frame 2 including pipe members. A steering column (not shown) is mounted to a front portion of the vehicle body frame 2 so as to extend substantially vertically with a relatively large caster angle. A bar-type steering handle 3 is mounted to an upper end of the steering column. A front wheel 5 is rotatably mounted to a lower region of the steering column by a pair of front forks 4 (only left front fork is illustrated in FIG. 1).

A rider straddles a seat S mounted to an upper region of a rear portion of the vehicle body frame 2, and grips a handle 3 to rotate the handle 3 around the steering column, thereby turning the front wheel 5 to the right or to the left. A rear wheel 7 is coupled to a rear portion of the vehicle body frame 2 through a swing arm 6 a part of which is illustrated. The rear wheel 7 is driven to rotate by a power transmitted from the engine E through a transmission 15 (see FIG. 4), a belt drive unit, or the like.

Figure 2:
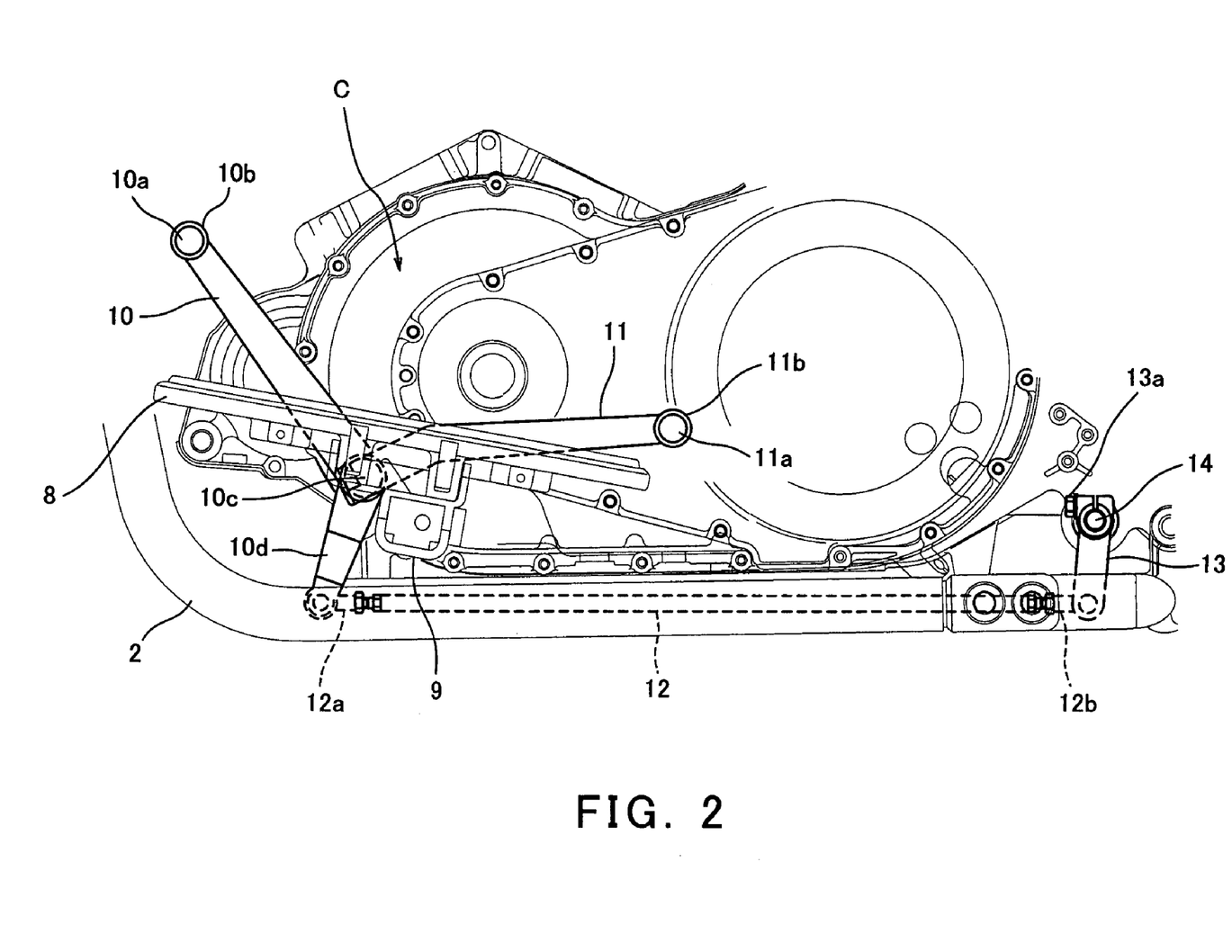
FIG. 2 is an enlarged view showing a link system equipped in the motorcycle of FIG. 1, through which a change pedal and a change shaft are coupled to each other.
Figure 3:
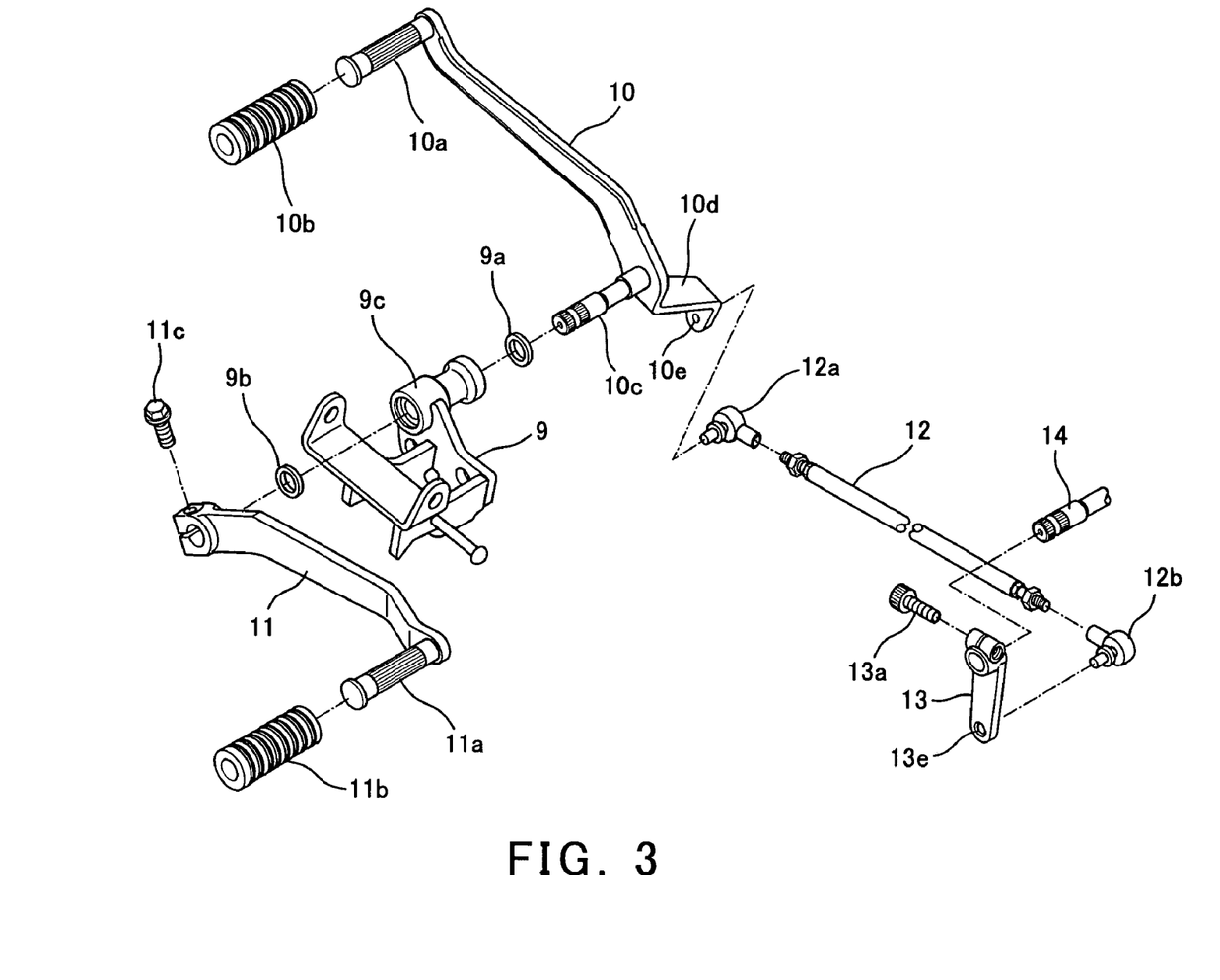
FIG. 3 is an exploded perspective view of the link system of FIG. 2.

FIG. 2 is an enlarged view showing a link system, through which a change pedal and a change shaft of the motorcycle 1 of FIG. 1 are coupled to each other. FIG. 3 is an exploded perspective view of the link system of FIG. 2. As shown in FIG. 2, a left foot step 8 is mounted to a lower portion of the vehicle body frame 2 by a step holder 9. A right foot step (not shown) is constructed as in the left foot step 8, and therefore, will not be further described.

The foot step 8 is held by the step holder 9 to be spaced a predetermined distance apart outward from a crankcase C. A front lever 10 extends upward and forward from a region between the foot step 8 and the crankcase C. A shaft 10c extends substantially horizontally and outward, i.e., away from the crankcase C, from a position in the longitudinal direction of the front lever 10. As shown in FIG. 3, the shaft 10c is mounted to extend through an interior of a tubular portion 9c of the step holder 9. Grease is filled in the tubular portion 9c of the step holder 9, and lip seals 9a and 9b are attached to inner regions of right and left openings formed in the tubular portion 9c. The front lever 10 includes a rod-shaped change pedal 10a extending substantially horizontally and outward from a front end portion thereof on an upper side thereof. The change pedal 10a is covered with a tubular pedal cover 10b made of resin containing rubber.

A front end portion of a rear lever 11 extending rearward is externally fitted to a tip end portion of the shaft portion 10c of the front lever 10 protruding outward relative to the step holder 9. The rear lever 11 is secured to the shaft 10c of the front lever 10 by threading a mounting bolt 11c into the front end portion thereof, allowing the front lever 10 and the rear lever 11 to rotate integrally around the shaft 10c. As in the front lever 10, the rear lever 11 includes a rod-shaped change pedal 11a extending substantially horizontally and outward from a rear end portion thereof, and the change pedal 11a is covered with a tubular pedal cover 11b made of resin containing rubber.

A hole 10e is formed at a rear end portion in a rear portion 10d of the front lever 10, extending downward relative to the shaft 10c, so as to open rightward and leftward. A front end of a change lever rod 12 extending forward and rearward is pivotally attached to the hole 10e by a joint 12a. The change lever rod 12 is rotatable relative to the rear portion 10d of the front lever 10 around a center axis oriented substantially horizontally. A joint 12b, which is identical to the joint 12a, is mounted to a rear end portion of the change lever rod 12. A hole 13e is formed at a lower end portion of a cantilever 13 extending substantially vertically so as to open rightward and leftward. The change lever rod 12 is mounted to the hole 13e such that the change lever rod 12 is pivotable around an axis oriented substantially rightward and leftward.

Figure 4:
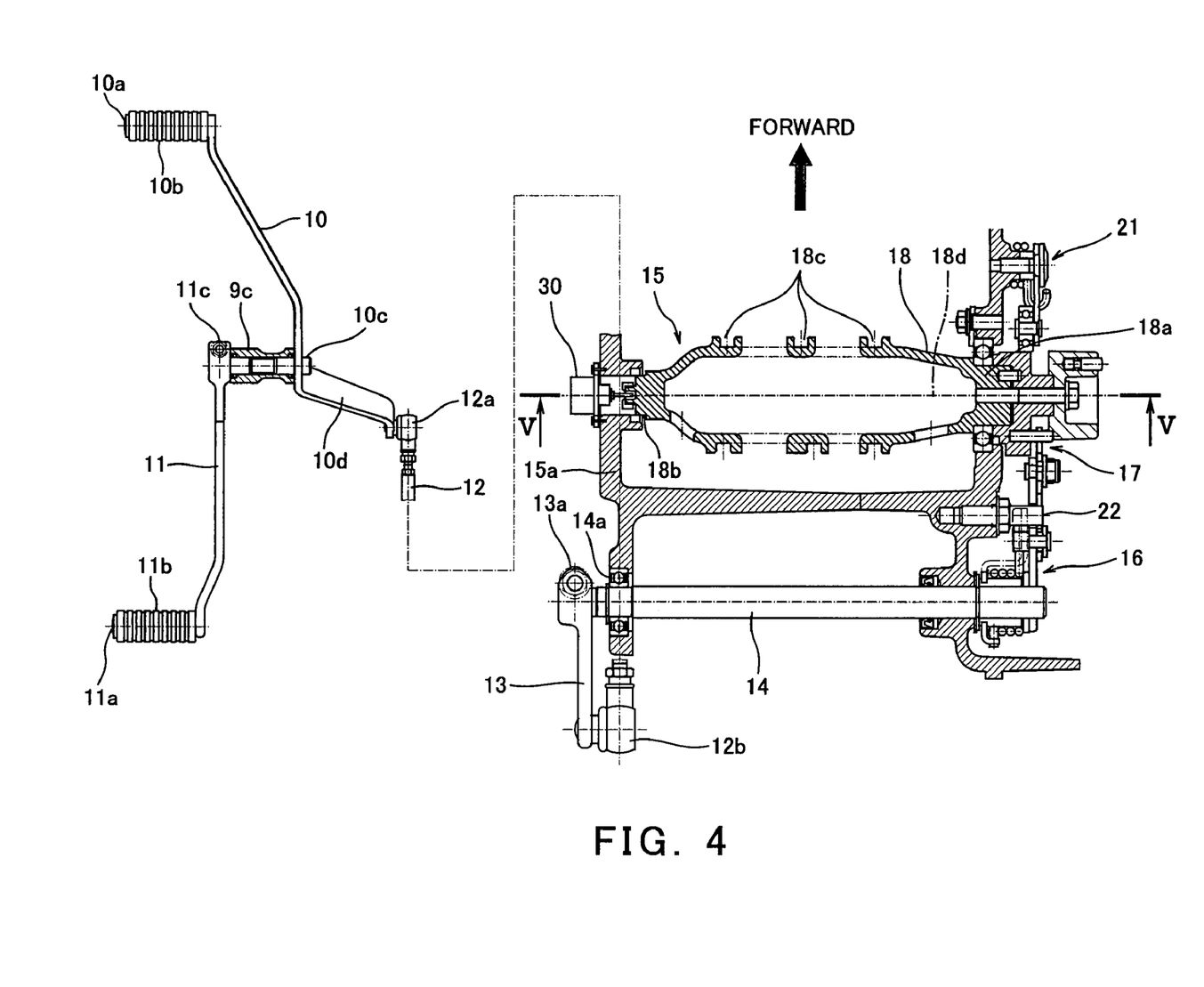
FIG. 4 is a plan view of the motorcycle of FIG. 1, showing a construction of a change system through which the change shaft and a shift drum are coupled to operate in association with each other.

As shown in a cross-sectional view of FIG. 4, a transmission 15 is accommodated in a case 15a. The change shaft 14 is disposed behind the transmission 15. The change shaft 14 is rotatably mounted at right and left portions thereof to the case 15a by bearings 14a mounted on the case 15a. Right and left end portions of the change shaft 14 protrude outward from the case 15a. An upper end portion, which is a base end portion, of the cantilever 13 is externally fitted to the left end portion of the change shaft 14. The cantilever 13 and the change shaft 14 are integrally rotatable by a mounting bolt 13a threaded into the upper end portion of the cantilever 13. A change lever 16 is mounted to the right end portion of the change shaft 14 so as to be integrally rotatable with the change shaft 14.

Figure 5:
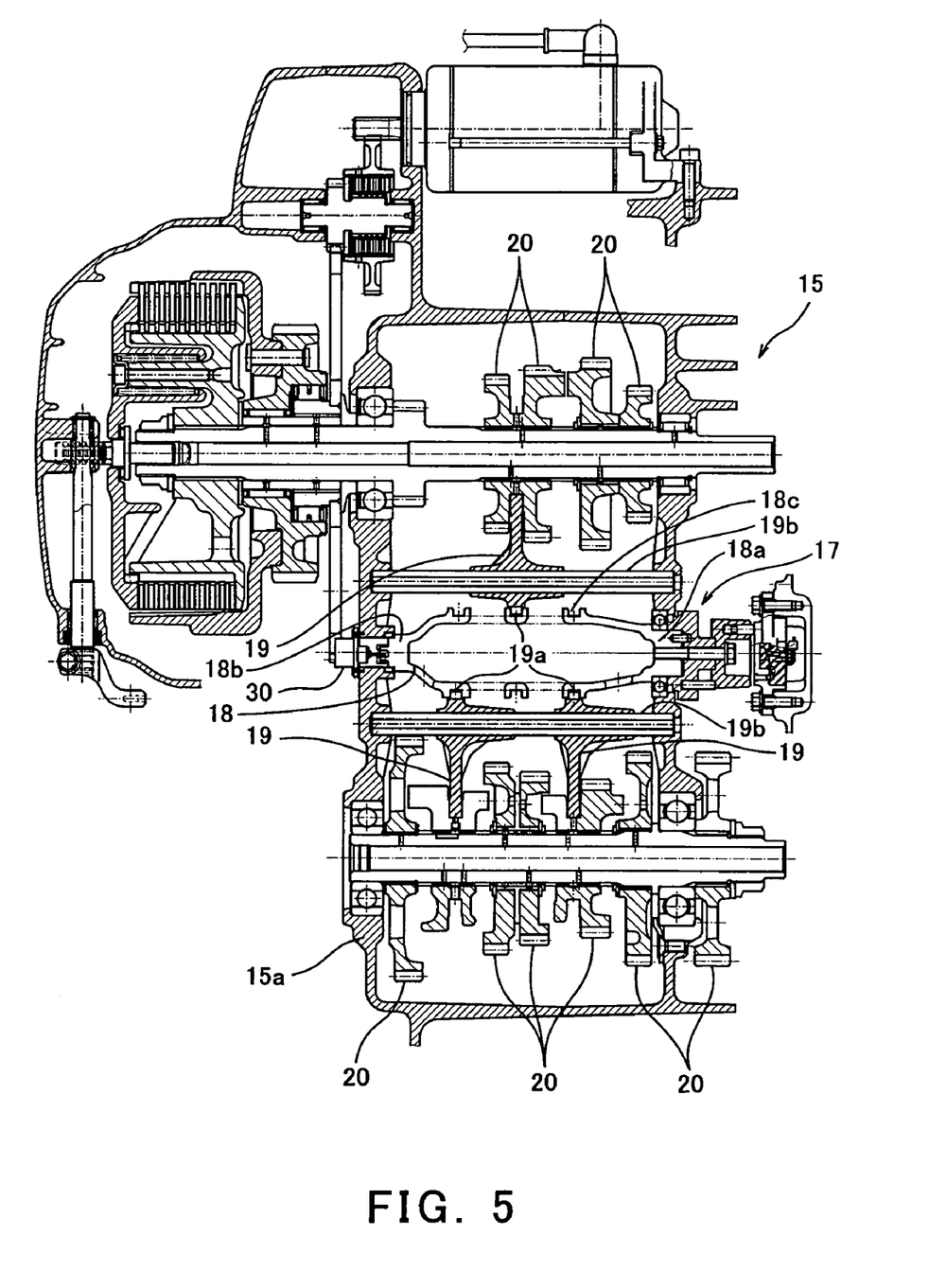
FIG. 5 is an exploded cross-sectional view of an engine, which is obtained by sectioning the engine along a plane extending through center axes of shafts of the transmission, as viewed from the direction of arrows along line V-V of FIG. 4.

FIG. 5 is an exploded cross-sectional view of the engine E, which is obtained by sectioning the engine E along a plane extending through center axes of shafts of the transmission 15, as viewed from the direction of arrows along line V-V of FIG. 4. As shown in FIG. 5, a shift drum 18 is accommodated in an interior of the case 15a so as to extend in parallel with the change shaft 14 (see FIG. 4). The shift drum 18 is of a hollow spindle shape. The shift drum 18 is rotatably mounted to the case 15a at right and left end portions 18a and 18b. A plurality of spiral cam grooves 18c are formed on an outer peripheral surface of the shift drum 18. A shift cam 17 is concentrically coupled to the right end portion 18a of the shift drum 18 and is configured to rotate integrally with the shift drum 18. A potentiometer 30 is coupled to the left end portion 18b of the shift drum 18 and is configured to detect a rotational angle (rotational phase) of the shift drum 18. A support shaft 19b is mounted to extend in parallel with the shift drum 18 in the interior of the case 15a. The support shaft 19b is inserted into a shift fork 19. The shift fork 19 is configured to be rotatable around the support shaft 19b and to be slidable in an axial direction of the support shaft 19b. The shift fork 19 has a pin 19a that is engageable with the cam groove 18c of the shift drum 18.

In the construction described above, as shown in FIG. 2, for example, when the rider kicks the front lever 10 to upshift the gear position to a higher gear position, the change lever rod 12 is pulled forward, and the cantilever 13 coupled to a rear end portion of the change lever rod 12 is pivoted forward (clockwise as viewed from the left of the vehicle body). When the rider presses down the rear lever 11 to downshift the gear position to a lower gear position, the changed lever rod 12 is pushed rearward, causing the cantilever 13 to pivot rearward (counterclockwise as viewed from the left of the vehicle body). The pivot operation of the cantilever 13 causes the change shaft 14 and the change lever 16 (see FIG. 4) to rotate in the same direction as the cantilever 13.

With reference to FIGS. 4 and 5, the intermittent rotation of the change lever 16 causes the shift cam 17 to rotate by a predetermined angle in the corresponding direction. Thereby, the shift drum 18 rotates integrally with the shift cam 17, causing the shift fork 19 engaging with the cam grooves 18c of the shift drum 18 to slide along the support shaft 19b. As a result, the mesh of gear 20 (gear position) of the transmission 15 is changed, and thus a speed change is accomplished.

Figure 6:
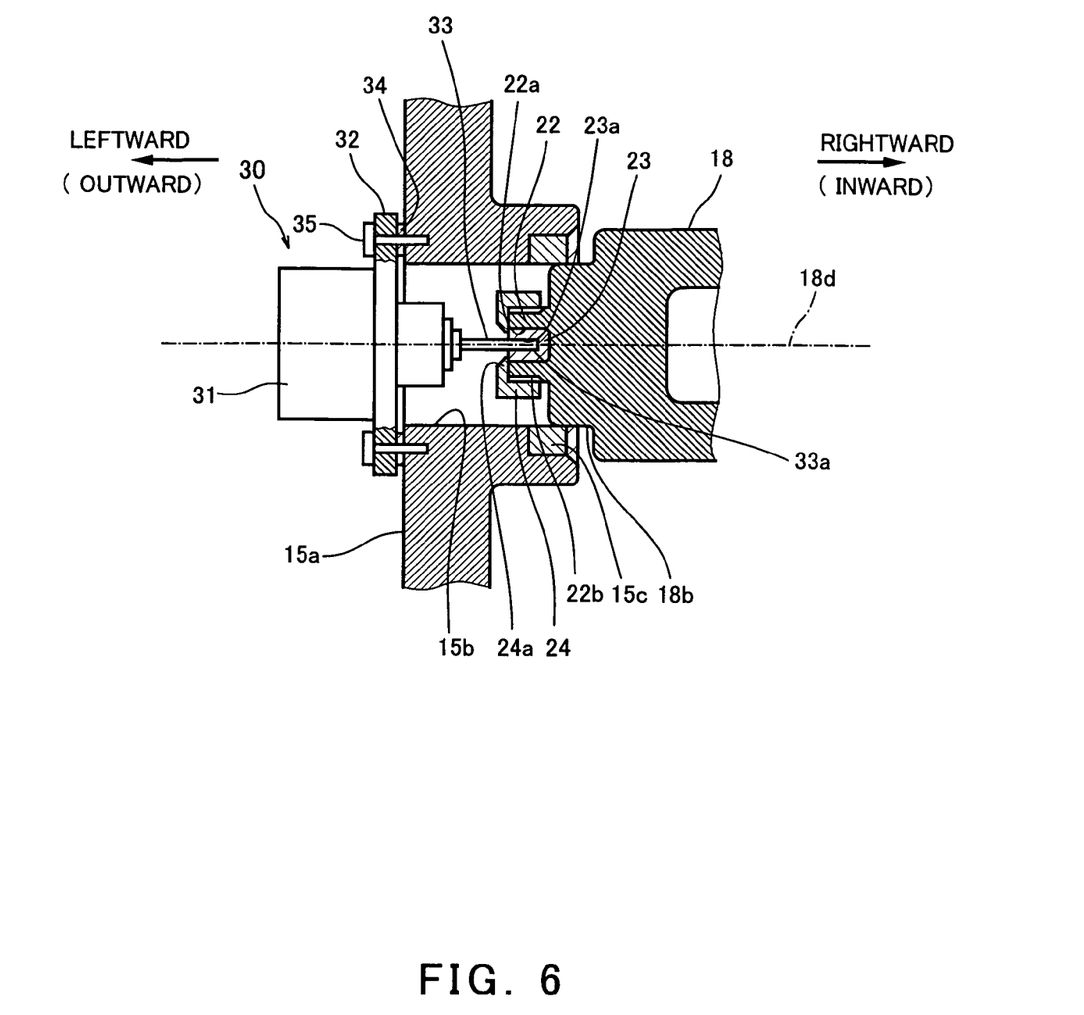
FIG. 6 is a partial cross-sectional view showing a structure of a region surrounding a potentiometer coupled to a left end portion of the shift drum.

FIG. 6 is a partial cross-sectional view showing a structure of a region surrounding the potentiometer 30 coupled to the left end portion 18a of the shift drum 18. As shown in FIG. 6, the case 15a is provided with a hole 15b penetrating the case 15a to extend rightward and leftward. A bearing 15c is mounted on an inward region of the hole 15b. The left end portion 18b of the shift drum 18 is mounted to the hole 15b of the case 15a by the bearing 15c.

A protruding portion 22 is formed at the left end portion 18b of the shift drum 18 to protrude outward (leftward) along a center axis 18d of the shift drum 18. A concave portion 22a is formed on the protruding portion 22 to be recessed inward (rightward) along the center axis 18d. The protruding portion 22, which includes the concave portion 22a, has a cylinder shape concentric with the shift drum 18. A damper 23, which is made of synthetic resin (in this embodiment, polypropylene) containing rubber, is fitted to the concave portion 22a. A concave portion 23a is formed on the damper 23 to be recessed inward (rightward) along the center axis 18*d*. The concave portion 23 has a substantially rectangular transverse cross-section (cross-section perpendicular to the center axis 18*d*).

A threaded portion 22*b* is formed on an outer peripheral surface of the protruding portion 22 to form a male threaded member. A nut 24, forming a female threaded member, is threadedly engaged with the protruding portion 22. The nut 24 has, at an outer end portion thereof, a stop portion 24*a* forming a small-diameter portion having an inner diameter smaller than an inner diameter of a threaded portion of the nut 24. When the nut 24 is threadedly engaged with the protruding portion 22 with the damper 23 fitted to the concave portion 22*a* of the protruding portion 22, the stop portion 24*a* comes into contact with an outer end face of the damper 23 to inhibit disengagement of the damper 23 from the concave portion 22*a*.

The potentiometer 30 is mounted to the hole 15*b* from outward of the case 15*b*. The potentiometer 30 includes a cylindrical base portion 31, a flange portion 32 protruding radially outward from the base portion 31, and a shaft portion 33 extending concentrically from the base portion 31. The potentiometer 30 is mounted to the case 15*a* in such a manner that the flange portion 32 is fastened to the case 15*a* by fastener members 35 with a damper 34 serving as a seal member fitted between the flange portion 32 and an outer peripheral surface of the case 15*a*. Thus, the shaft portion 33 of the potentiometer 30 is aligned concentrically with the center axis 18*d* of the shift drum 18.

With the flange portion 32 fastened to the case 15*a*, a tip end portion 33*a* of the shaft portion 33 of the potentiometer 30 is pressed into the concave portion 23*a* of the damper 23 attached on the shift drum 18. That is, the tip end portion 33*a* of the shaft portion 33 is shaped such that opposite peripheral regions with respect to a center axis thereof are flat to form a substantially rectangular transverse cross-section so as to conform in shape to the concave portion 23*a* of the damper 23. The transverse cross-section of the tip end portion 33*a* of the shaft portion 33 is slightly larger than that of the concave portion 23*a* of the damper 23. Therefore, the tip end portion 33*a* of the shaft portion 33 is press-fitted into the concave portion 23*a* of the damper 23.

In the above construction, the shaft portion 33 rotates according to the rotation of the shift drum 18, and the potentiometer 30 outputs a signal according to a rotational angle (rotational phase) of the shaft portion 33. Typically, the potentiometer 33 is less likely to output a signal containing noise if a rotational force or an axial force is externally applied to the shaft portion 33. In this embodiment, since the shaft portion 33 is coupled to the shift drum 18 through the damper 23 that is able to absorb a fluctuation of the shift drum 18, the output signal is less likely to include noise, irrespective of the fluctuation in the rotational direction or the axial direction of the shift drum 18.

Figure 7:
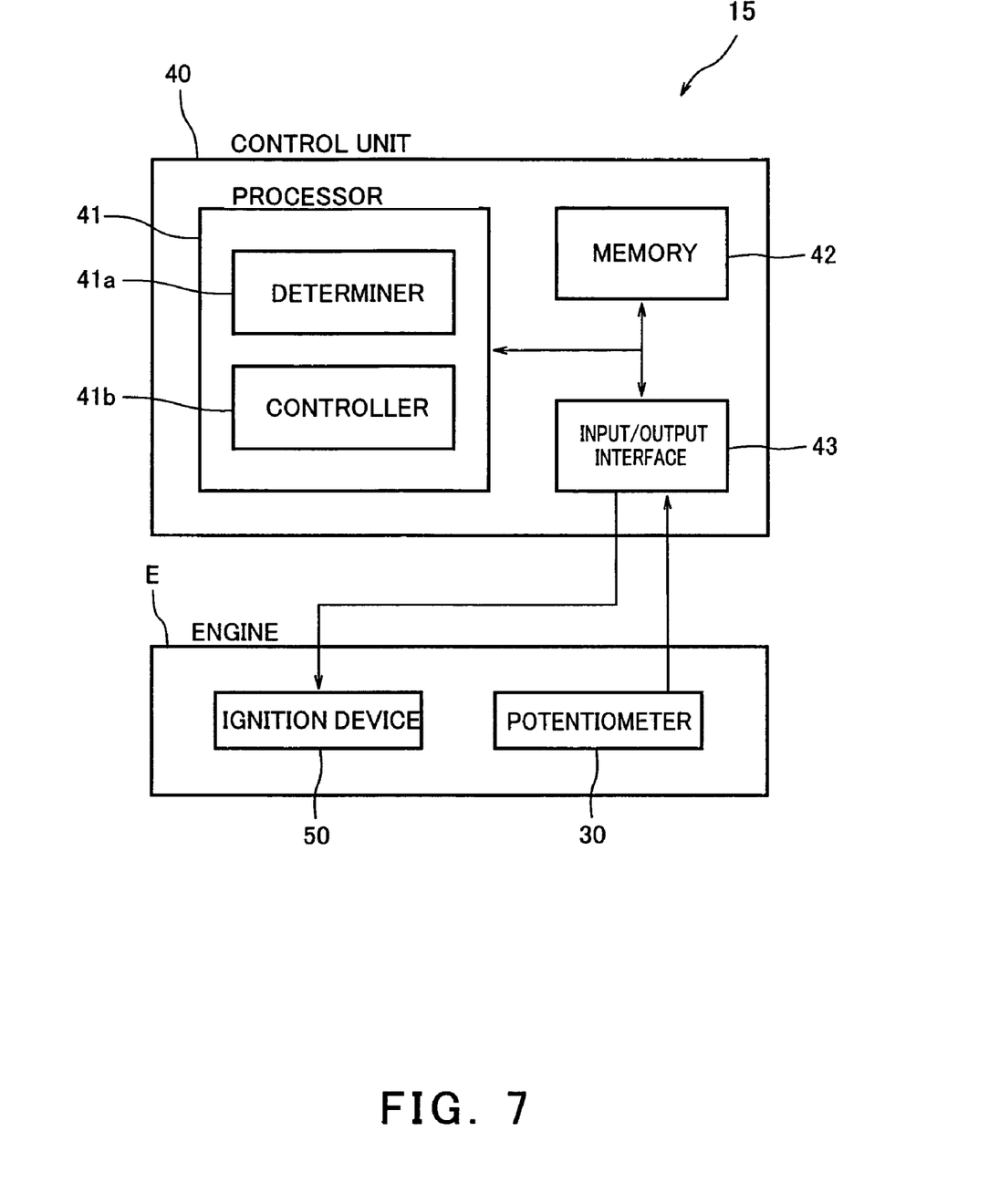
FIG. 7 is a block diagram showing a configuration for controlling an operation of an engine based on a signal from the potentiometer of the transmission according to the embodiment.

FIG. 7 is a block diagram showing a configuration for controlling an operation of the engine E based on the signal from the potentiometer 30 of the transmission 15 according to the embodiment. As shown in FIG. 7, the transmission 15 includes a control unit 40 configured to receive signals from the potentiometer 30 to make determination processes, and to control the operation of the engine E.

The control unit 40 primarily includes a processor 41 such as a CPU (central processing unit), a memory 42, and an input/output interface 43. The memory 42 contains programs required to control the engine E according to this embodiment. The processor 41 may operate based on the programs stored in the memory 42 to function as a determiner 41*a* configured to determine the gear position or to determine whether or not the gear position has been upshifted. In addition, the processor 41 may function as a controller 41*b* configured to control an ignition timing of an ignition device 50 equipped in the engine E.

The memory 42 contains programs to be loaded into and run by the processor 41, and is further able to temporarily store data to be referred to during an operation of the processor 41 or signals or the like externally input through the input/output interface 43. The input/output interface 43 is communicatively coupled to the potentiometer 30 equipped in the engine E and is configured to receive the signals from the potentiometer 30 in a predetermined sampling period and to communicate these signals to the processor 41 or the memory 42. The input/output interface 43 is further communicatively coupled to the ignition device 50 equipped in the engine E, and is configured to send a signal for controlling an ignition timing to the ignition device 50 in accordance with an instruction from the processor 41.

Although not shown, other sensors such as a crank position sensor configured to detect an engine speed of the engine E, and a cam angle sensor configured to detect a cam angle, are equipped in the engine E. These sensors output signals, which are received in the control unit 40 through the input/output interface 43.

Figure 8:
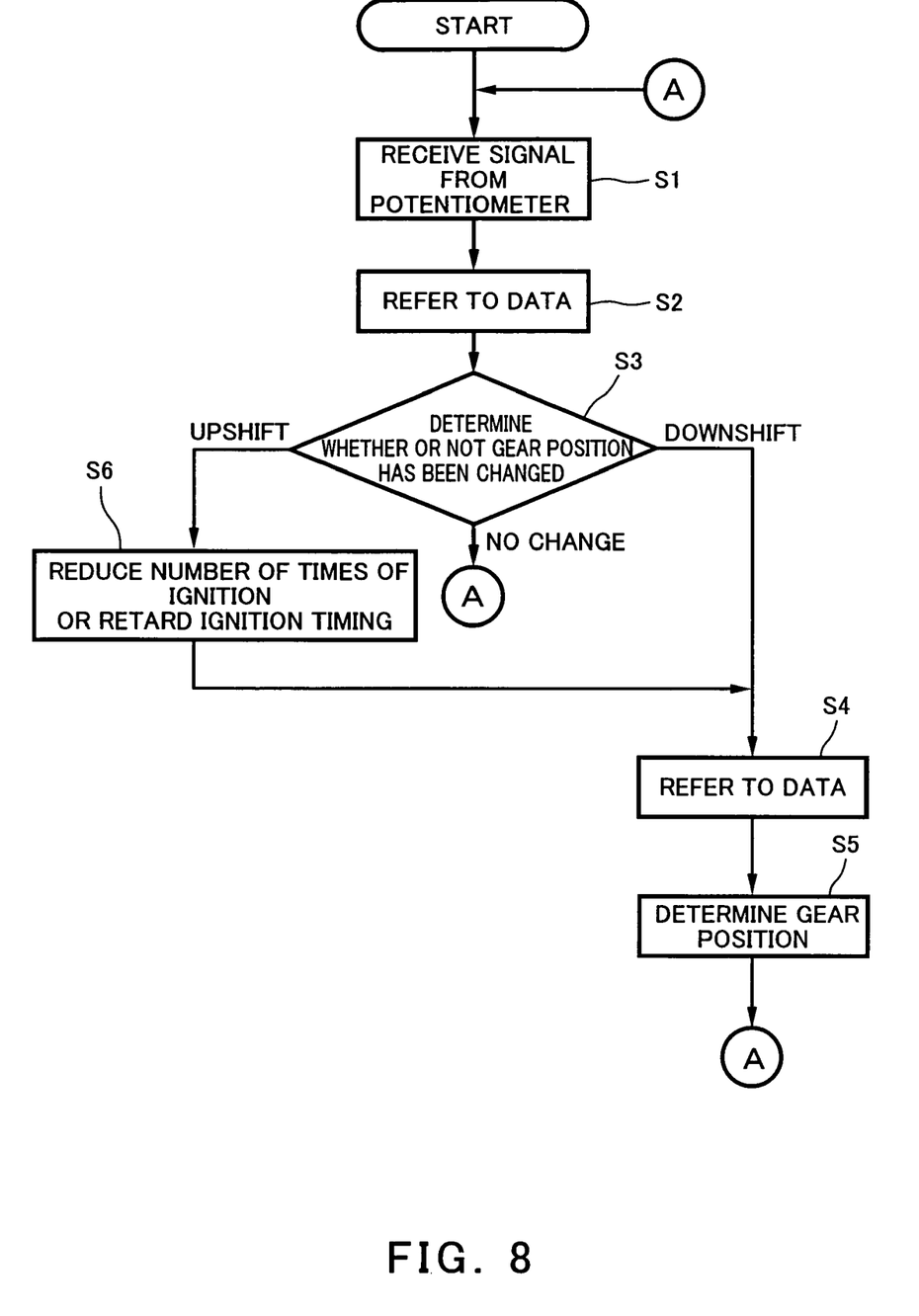
FIG. 8 is a flowchart showing an operation of a processor performed when the transmission determines a gear position and controls an ignition timing based on a signal from the potentiometer.

FIG. 8 is a flowchart showing the operation of the processor 41 performed when the above constructed transmission 15 determines the gear position and controls the ignition timing based on the signal from the potentiometer 30. As shown in FIG. 8, receiving the signal from the potentiometer 30 in the predetermined sampling period (S1), the processor 41 refers to the data stored in the memory 42 (S2), and determines whether or not the rider has operated the front lever 10 or the rear lever 11 (see FIG. 1) to change the gear position, respectively (S3). If it is determined that the gear position has not been changed, the processor 41 returns the process to the step S1, whereas if it is determined that the rider has operated to downshift the gear position, the processor 41 refers to the data stored in the memory 42 (S4) and determines the gear position based on the value of the signal from the potentiometer 30 (S5).

On the other hand, if it is determined that the rider has operated to upshift the gear position, the processor 41 causes the ignition device 50 to reduce the number of times of ignition of a fuel gas in an interior of a combustion chamber or to retard an ignition timing (S6), refers to the data stored in the memory 42 (S4), and determines the gear position (S5). The processor 41 functions as the determiner 41*a* to execute the steps 1 to 5 and functions as the controller 41*b* to execute step S6.

In step S6, the number of times of ignition may be reduced or the ignition timing may be retarded in a known manner. By way of example, the number of times of ignition may be reduced in such a manner that ignition in a certain cylinder is stopped during a preset rotation(s) of a crankshaft (not shown) of the engine E. A time period during which the number of times of ignition is reduced or the ignition timing is retarded need not be set based on the number of rotations of the crankshaft, but may be a time period that elapses until when a sensor has detected clutch connection.

The data stored in the memory 42 which are to be referred in step S2 and in step S4 will be described with reference to FIGS. 9 and 10. For the sake of convenience, the data to be referred to in step S4 to determine the gear position will be first described.

Figure 9:
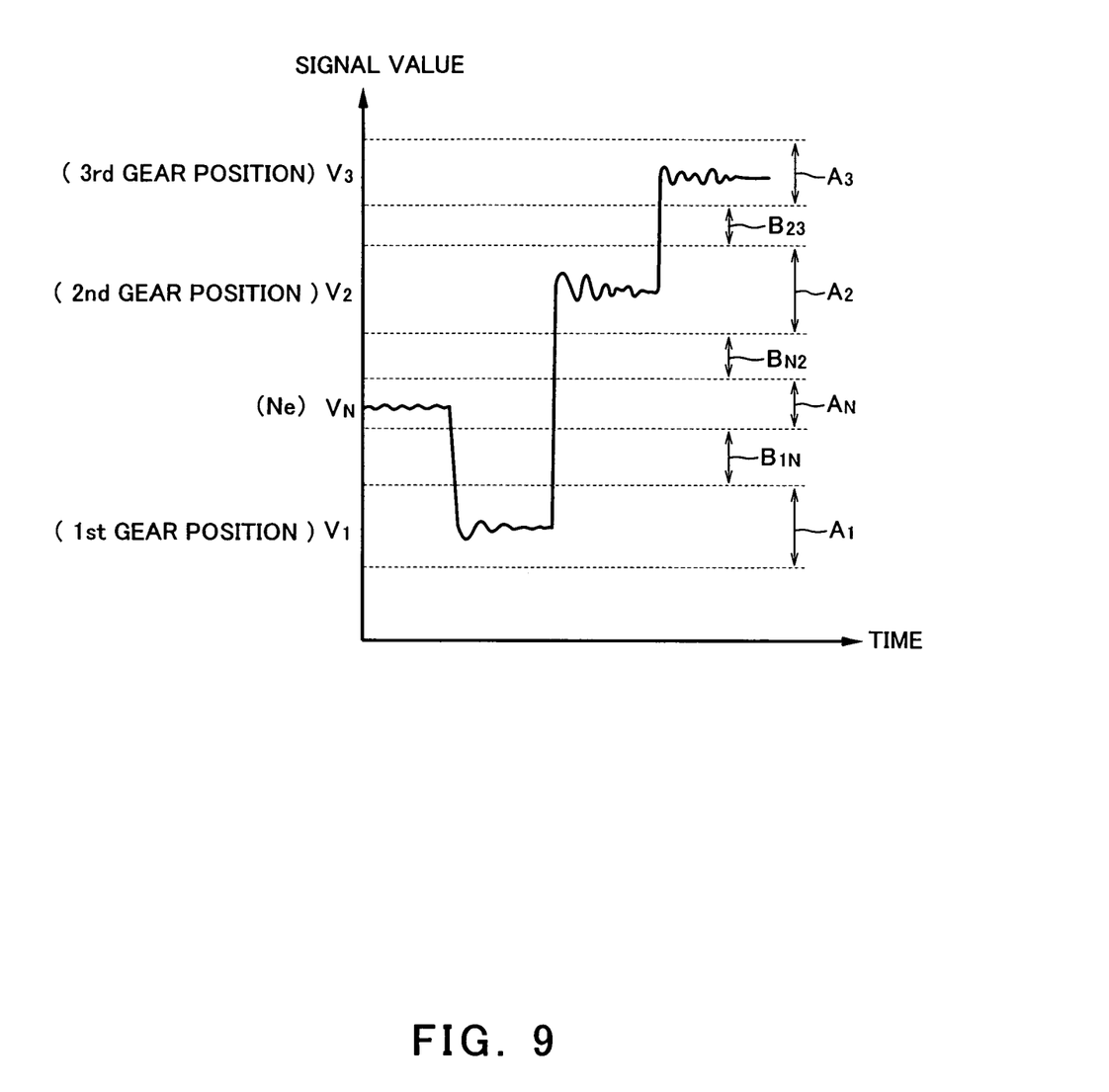
FIG. 9 is a graphical representation illustrating a value of the signal output from the potentiometer that changes when the gear position is upshifted from a neutral gear position.
Figure 10:
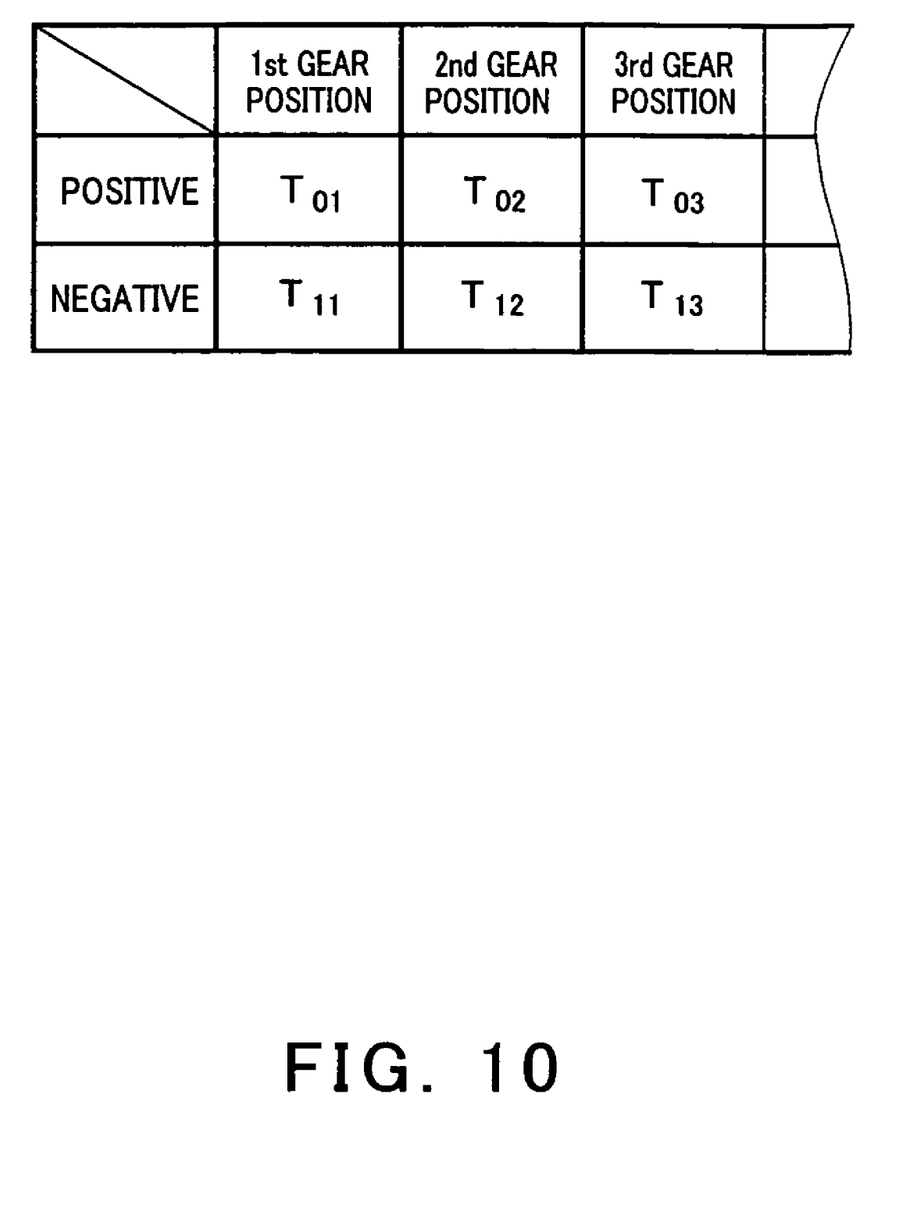
FIG. 10 is a table that illustrates thresholds with which the processor determines whether or not the gear position has been changed.

FIG. 9 is a graphical representation showing a variation in the value of the signal output from the potentiometer 30 (see FIG. 6), which occurs when the gear position is upshifted from a neutral gear position (Ne), to a 1st gear position, a 2nd gear position, etc. As shown in FIG. 9, the value of the signal output from the potentiometer 30 is the smallest ($V_1$) at the 1st gear position, and increases to $V_N$ at the neutral gear position, $V_2$ at the 2nd gear position, and $V_3$ at the 3rd gear position. Because even the signal output from the potentiometer 30 is likely to contain a little noise, its value tends to fluctuate immediately after the gear position has been changed, but becomes substantially steady at $V_1$, $V_N$, $V_2$, $V_3$, etc., corresponding to the respective gear positions.

Determination bands $A_1$, $A_N$, $A_2$, $A_3$, etc., having predetermined ranges respectively including the values $V_1$, $V_N$, $V_2$, $V_3$, etc., corresponding to the respective gear positions are set for the value of the signal output from the potentiometer 30. In step S5 of FIG. 8, the processor 41 (determiner 41a) determines the gear position depending on which determination band the value of the signal from the potentiometer 50 falls within.

The determination bands are individually set for the respective gear positions. For example, the determination band $A_1$ corresponding to the 1st gear position and the determination band $A_2$ corresponding to the 2nd gear position are each set to have a predetermined range having a width that corresponds to a characteristic of each gear position. The characteristic includes a magnitude of a fluctuation that tends to occur in the signal output from the potentiometer 30, when the gear position has been changed. Further, it will also be appreciated that the determination band may be decided based on factors in addition to or instead of this characteristic. By setting the respective determination bands in this manner, the gear positions can be determined more correctly. A plurality of or all of the determination bands may be set to have an equal width. In that case, the gear position can be determined correctly in the same manner.

As shown in FIG. 9, dead bands $B_{1N}$, $B_{N2}$, $B_{23}$, etc., having predetermined ranges are each set between adjacent determination bands. To be specific, the dead band $B_{1N}$ is set between the determination band $A_1$ corresponding to the 1st gear position and the determination band $A_N$ corresponding to the neutral gear position, the dead band $B_{N2}$ is set between the determination band $A_N$ corresponding to the neutral gear position and the determination band $A_2$ corresponding to the 2nd gear position, and the dead band $B_{23}$ is set between the determination band $A_2$ corresponding to the 2nd gear position and the determination band $A_3$ corresponding to the 3rd gear position. These dead bands are set to have ranges of signal values by which the processor 41 does not determine the gear positions. If the signal output from the potentiometer 30 has a value included in any of the dead bands, the processor 41 does not execute the step of determining the gear position (Step S5 in FIG. 8). As a result, it is possible to avoid an event in which the determination result of the gear position changes many times between adjacent gear positions (e.g., 2nd gear position and 3rd gear position) because of a great fluctuation of the signal values, immediately after the gear position has been changed.

The data contained in the memory 42 which is referred to by the processor 41 in step S4 contains the values $V_1$, $V_N$, $V_2$, $V_3$ . . . corresponding to the respective gear positions, the determination bands $A_1$, $A_N$, $A_2$, $A_3$ . . . , and the dead bands $B_{1N}$, $B_{N2}$, $B_{23}$, . . . . In this embodiment, in step S5 of FIG. 8, if the value of the signal output from the potentiometer 30 continues to fall within any one of the determination bands $A_1$, $A_N$, $A_2$, $A_3$ . . . for a predetermined time period, then the processor 41 assumes that the potentiometer 30 outputs the corresponding value included in that determination band and determines that the gear position indicated by the corresponding value is the gear position at the present moment.

Next, the data contained in the memory 42, which are to be referred to in step S2 prior to the step S3 to determine whether or not the gear position has been changed, will be described. FIG. 10 is a table that illustrates thresholds with which the processor 41 determines whether or not the gear position has been changed. As shown in FIG. 10, thresholds $T_{01}$, $T_{02}$, $T_{03}$ (positive), and thresholds $T_{11}$, $T_{12}$, $T_{13}$ (negative) are set for the respective gear positions (1st gear position, 2nd gear position, 3rd gear position, etc.).

Figure 11:
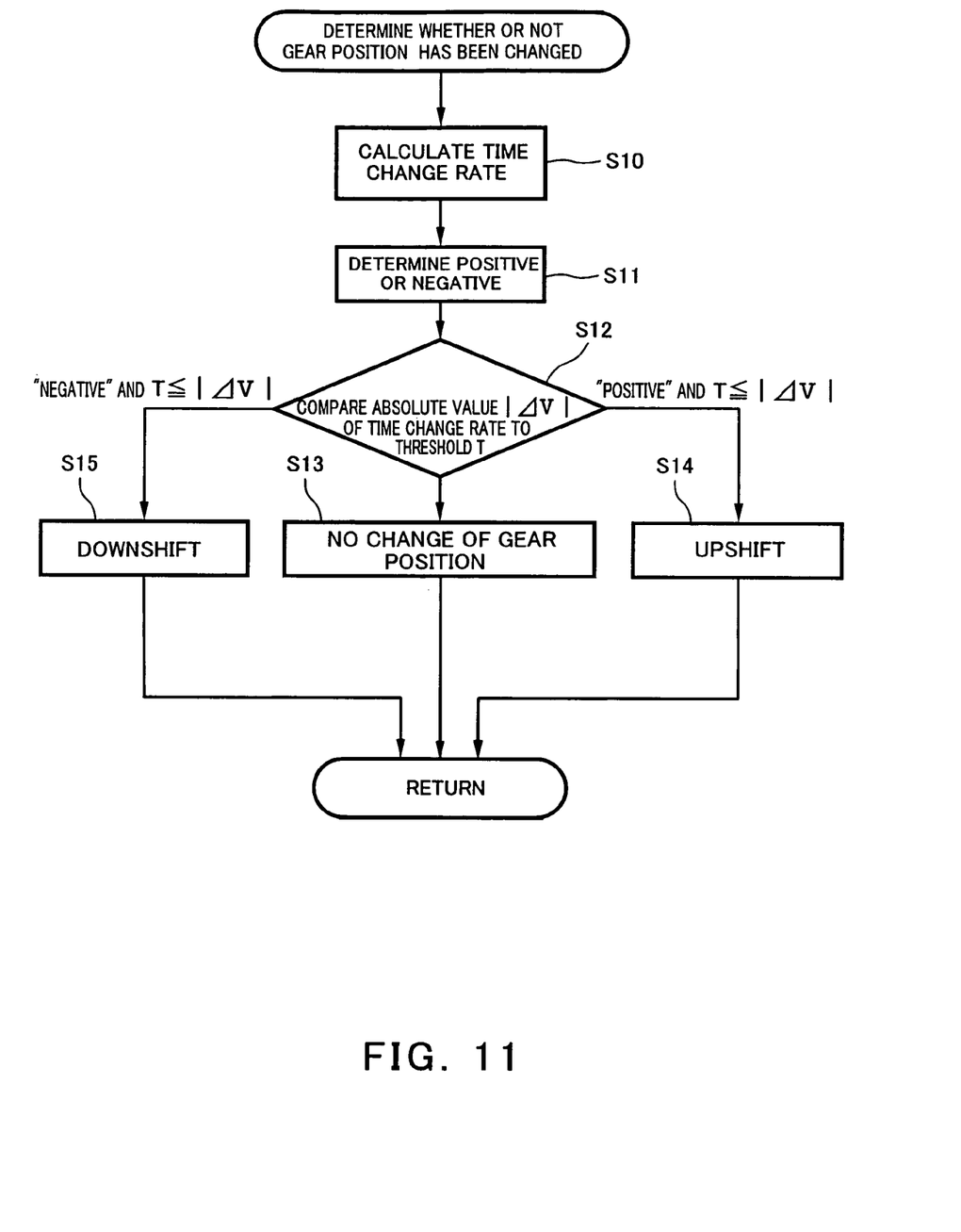
FIG. 11 is a flowchart showing an operation of the processor to determine whether or not the gear position has been changed.

In step S3 in FIG. 8, the processor 41 determines whether or not the gear position has been changed based on these thresholds as a reference, as illustrated in the flowchart of FIG. 11. First, the processor 41 calculates a time change rate $\Delta V$ (slope of a graphical representation of FIG. 9) of the signal received in each predetermined sampling period from the potentiometer 30 (S10). To be specific, the time change rate $\Delta V$ may be calculated by dividing two signal values of signals received in succession by a time corresponding to the sampling period. Then, the processor 41 determines whether the time change rate $\Delta V$ is a positive value or a negative value (S11). A positive value indicates that the gear position has been probably upshifted and a negative value indicates that the gear position has been probably downshifted.

After it has been determined that the time change rate $\Delta V$ is the positive value or the negative value, the processor 41 compares a threshold T (e.g., $T_{02}$) that is associated with the gear position (e.g., 2nd gear position) immediately before receiving the signal from the potentiometer 30 and the determination result (e.g., positive) in step S11, to an absolute value of the time change rate $\Delta V$ calculated in step S10 (S12). If the absolute value of the time change rate $\Delta V$ is smaller than the threshold T, then the processor 41 determines that the gear position has not been changed (S13). On the other hand, if the absolute value of the time change rate $\Delta V$ is not smaller than the threshold T, and the determination result in Step S11 is "positive," the processor 41 determines that the gear position has been upshifted (S14), whereas if the absolute value of the time change rate $\Delta V$ is not smaller than the threshold T and the determination result in Step S11 is "negative," the processor 41 determines that the gear position has been downshifted (S15).

In accordance with this configuration, when the gear position has been changed, it is able to be determined whether or not the gear position has been changed and whether or not the gear position has been upshifted, before the potentiometer 30 outputs the value corresponding to the changed gear position. Therefore, when the gear position has been upshifted, the ignition device 50 (see FIG. 7) can be controlled immediately, to retard the ignition timing or reduce the number of times of ignition (step S6 in FIG. 8).

As the above mentioned potentiometer 30, most commercially available potentiometers may be used. In particular, a non-contact potentiometer is advantageous because entry of noise into the signal, which may be caused by a force externally applied to the shaft portion 33, is less likely to occur. Furthermore, a contact potentiometer or other rotational angle sensor may be used, except for a general resistive contact sensor, which is likely to generate a large noise because the correct contact state between the arm and the resistive element cannot be maintained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A transmission configured to change a gear position by rotation of a shift drum operative in association with an operation of a change pedal, comprising:
    a potentiometer configured to detect a rotational angle of the shift drum; and
    a determiner configured to determine a gear position based on a determination that a value of a signal output from the potentiometer falls within a determination band having a predetermined range.

2. The transmission according to claim 1,
    wherein the determination band is one of a plurality of respective determination bands set for each gear position, and a corresponding dead band, which is not a reference by which the determiner determines the gear position, is set between each pair of adjacent determination bands by which the determiner determines the gear position.

3. The transmission according to claim 1,
    wherein the determiner is configured to determine that the gear position has been changed when an absolute value of a change rate of the value of the signal output from the potentiometer is larger than a predetermined threshold.

4. The transmission according to claim 3,
    wherein the determiner is configured to determine whether the gear position has been upshifted or downshifted, based on whether the change rate of the value of the signal output from the potentiometer is positive or negative.

5. The transmission according to claim 3,
    wherein the threshold is set for each gear position.

6. The transmission according to claim 4, further comprising:
    a controller configured to control an operation of an ignition system configured to ignite a fuel gas in an interior of a combustion chamber of an engine;
    wherein the controller is configured to cause the ignition system to retard an ignition timing or to reduce the number of times of ignition, when the determiner determines that the gear position has been upshifted.

7. The transmission according to claim 1,
    wherein the potentiometer includes an input shaft which is coupled to the shift drum through a damper made of synthetic resin that is fitted between the input shaft and the shift drum, and is configured to be rotatable substantially integrally with the shift drum.

8. The transmission according to claim 7,
    wherein the input shaft of the potentiometer is configured to be press-fitted into the damper.

9. The transmission according to claim 7,
    wherein the damper is accommodated in a concave portion formed at an end portion in an axial direction of the shift drum, and the shift drum is provided with a stop portion configured to inhibit disengagement of the damper from the concave portion.

10. A motorcycle comprising:
    a transmission configured to change a gear position by rotation of a shift drum operative in association with an operation of a change pedal, the transmission including:
    a potentiometer configured to detect a rotational angle of the shift drum; and
    a determiner configured to determine a gear position based on a determination that a value of a signal output from the potentiometer falls within a determination band having a predetermined range.

* * * * *